United States Patent
Morris

(10) Patent No.: US 7,461,331 B2
(45) Date of Patent: Dec. 2, 2008

(54) AUTOMATED CONSTRUCTION OF PRINT ORDER FOR IMAGES CAPTURE DURING A SESSION

(75) Inventor: Robert P. Morris, Raleigh, NC (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 286 days.

(21) Appl. No.: 11/022,131

(22) Filed: Dec. 21, 2004

(65) Prior Publication Data

US 2006/0136559 A1    Jun. 22, 2006

(51) Int. Cl.
*G06F 17/00* (2006.01)

(52) U.S. Cl. ..................................... 715/205

(58) Field of Classification Search .............. 715/500, 715/500.1, 530, 200, 255, 201, 205
See application file for complete search history.

(56) References Cited

U.S. PATENT DOCUMENTS

| | | | |
|---|---|---|---|
| 6,018,774 A | 1/2000 | Mayle et al. | 709/250 |
| 6,133,985 A * | 10/2000 | Garfinkle et al. | 355/40 |
| 6,388,732 B1 * | 5/2002 | Williams et al. | 355/40 |
| 6,397,194 B1 * | 5/2002 | Houvener et al. | 705/16 |
| 6,573,927 B2 * | 6/2003 | Parulski et al. | 348/32 |
| 6,636,259 B1 * | 10/2003 | Anderson et al. | 348/211.3 |
| 6,714,204 B2 | 3/2004 | Ishida et al. | 345/522 |
| 6,715,003 B1 | 3/2004 | Safai | 710/33 |
| 6,784,924 B2 | 8/2004 | Ward et al. | 348/207.1 |
| 6,798,532 B1 | 9/2004 | Okino | 358/1.15 |
| 6,812,961 B1 * | 11/2004 | Parulski et al. | 348/231.2 |
| 6,812,962 B1 | 11/2004 | Fredlund et al. | 348/231.2 |
| 6,836,617 B1 * | 12/2004 | Parulski | 396/6 |
| 6,915,273 B1 * | 7/2005 | Parulski | 705/26 |
| 6,937,997 B1 * | 8/2005 | Parulski | 705/26 |
| 7,082,227 B1 * | 7/2006 | Baum et al. | 382/311 |
| 7,112,134 B1 * | 9/2006 | Erlichman | 463/16 |
| 7,117,519 B1 * | 10/2006 | Anderson et al. | 725/105 |
| 7,173,651 B1 * | 2/2007 | Knowles | 348/207.1 |
| 7,231,359 B2 * | 6/2007 | Parulski | 705/26 |
| 7,342,677 B2 * | 3/2008 | Huysmans | 358/1.15 |
| 2001/0034774 A1 | 10/2001 | Watanabe et al. | 709/217 |
| 2002/0010722 A1 * | 1/2002 | Takayama | 707/527 |

(Continued)

OTHER PUBLICATIONS

Frohlich et al., Requirements for Photoware, ACM 2002, pp. 166-175.*

(Continued)

*Primary Examiner*—Cong-Lac Huynh

(57) ABSTRACT

A method and system for guiding management of digital images includes: receiving at least one captured digital image with an account identifier; creating a message to an address associated with the account identifier, where the message includes an access to a form to proceed with a specific task associated with the at least one captured digital image; and sending the message to the address. A user can then access the form through the message and provide form data to the server. The server can then proceed with the next step in the task. In this manner, specific tasks in the management of digital images can be uploaded to a server, and the user is reminded to access the server to perform these tasks. The user is not required to manage the image on the image capture device or to remember to finish a specific task associated with the captured images.

20 Claims, 3 Drawing Sheets

U.S. PATENT DOCUMENTS

| | | | |
|---|---|---|---|
| 2002/0051177 A1* | 5/2002 | Nomoto | 358/1.15 |
| 2002/0052753 A1* | 5/2002 | Shinkai | 705/1 |
| 2002/0131070 A1 | 9/2002 | Housel et al. | 358/1.15 |
| 2003/0025796 A1 | 2/2003 | Yamagishi | 348/207.2 |
| 2003/0071964 A1* | 4/2003 | Doshi | 351/159 |
| 2003/0074373 A1* | 4/2003 | Kaburagi et al. | 707/104.1 |
| 2003/0090598 A1* | 5/2003 | Johngren et al. | 348/838 |
| 2003/0123069 A1* | 7/2003 | Perala | 358/1.2 |
| 2003/0188261 A1* | 10/2003 | Smith et al. | 715/505 |
| 2004/0039653 A1* | 2/2004 | Nigrin | 705/26 |
| 2004/0070670 A1 | 4/2004 | Foster | 348/207.1 |
| 2004/0075746 A1 | 4/2004 | Takamine et al. | 348/207.1 |
| 2004/0109066 A1 | 6/2004 | Inoue et al. | 348/207.99 |
| 2004/0111415 A1* | 6/2004 | Scardino et al. | 707/10 |
| 2004/0111493 A1* | 6/2004 | Yamaguchi et al. | 709/219 |
| 2004/0117255 A1* | 6/2004 | Nemirofsky et al. | 705/14 |
| 2004/0172646 A1* | 9/2004 | McIntyre et al. | 725/1 |
| 2004/0210845 A1* | 10/2004 | Paul et al. | 715/731 |
| 2004/0218045 A1* | 11/2004 | Bodnar et al. | 348/207.1 |
| 2004/0234152 A1* | 11/2004 | Liege et al. | 382/254 |
| 2004/0236785 A1* | 11/2004 | Greiner | 707/104.1 |
| 2004/0260614 A1* | 12/2004 | Taratino et al. | 705/26 |
| 2004/0267639 A1* | 12/2004 | McIntyre et al. | 705/27 |
| 2005/0097173 A1* | 5/2005 | Johns et al. | 709/206 |
| 2005/0102198 A1* | 5/2005 | Parulski | 705/26 |
| 2005/0131765 A1* | 6/2005 | Rivera et al. | 705/26 |
| 2005/0182649 A1* | 8/2005 | Parulski | 705/1 |
| 2006/0074721 A1* | 4/2006 | Cotthingham et al. | 705/3 |
| 2006/0143684 A1* | 6/2006 | Morris | 725/138 |
| 2006/0206429 A1* | 9/2006 | Martinez | 705/50 |
| 2007/0016598 A1* | 1/2007 | Tessman et al. | 707/100 |
| 2007/0107007 A1* | 5/2007 | Wolcott et al. | 725/1 |
| 2007/0153330 A1* | 7/2007 | Nomoto | 358/1.15 |

OTHER PUBLICATIONS

Toyama et al., Geographic Location Tags on Digital Images, ACM 2003, pp. 156-166.*

Crabtree et al., Collaborating Around Collections: Informing the Continued Development of Photoware, ACM 2004, pp. 396-405.*

Rodden et al., How Do People Manage Their Digital Photographs?, ACM 2003, pp. 409-416.*

Sarvas et al., MobShare: Controlled and Immediate Sharing of Mobile Images, ACM 2004, pp. 724-731.*

Corcoran et al., Internet Enabled Digital Photography, IEEE 1999, pp. 577-583.*

Corcoran et al., Internet Connectivity Solutions for Digital Photography, IEEE 2000, pp. 494-498.*

* cited by examiner

AUTOMATED CONSTRUCTION OF PRINT ORDER FOR IMAGES CAPTURE DURING A SESSION

FIELD OF THE INVENTION

The present invention relates to digital images and more particularly to guiding the management of digital images.

BACKGROUND OF THE INVENTION

Images taken on digital cameras and camera phones are difficult to manage. Most images remain on the image capture device. Some services provide for ways to automatically move the images to a server, where they can be managed more easily. Example tasks often associated with newly captured images are printing and organizing. These tasks are difficult to manage on the image capture device. Automatic printing or organizing is sometimes offered, but they provide little flexibility. Offloading these tasks to a server provides more flexibility, but the user is required to visit the server to proceed with the tasks, which the user often forgets to do.

Accordingly, there exists a need for a method and system for guiding the management of digital images. After the digital images are uploaded to a server, the method and system should automatically remind the user to visit the server to proceed with specific tasks.

SUMMARY OF THE INVENTION

A method and system for guiding management of digital images includes: receiving at least one captured digital image with an account identifier; creating a message to an address associated with the account identifier, where the message includes an access to a form to proceed with a specific task associated with the at least one captured digital image; and sending the message to the address. A user can then access the form through the message and provide form data to the server. The server can then proceed with the next step in the task. In this manner, specific tasks in the management of digital images can be uploaded to a server, and the user is reminded to access the server to perform these tasks. The user is not required to manage the image on the image capture device or to remember to finish a specific task associated with the captured images.

DETAILED DESCRIPTION

The present invention provides a method and system for guiding the management of digital images. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below.

Figure 1:
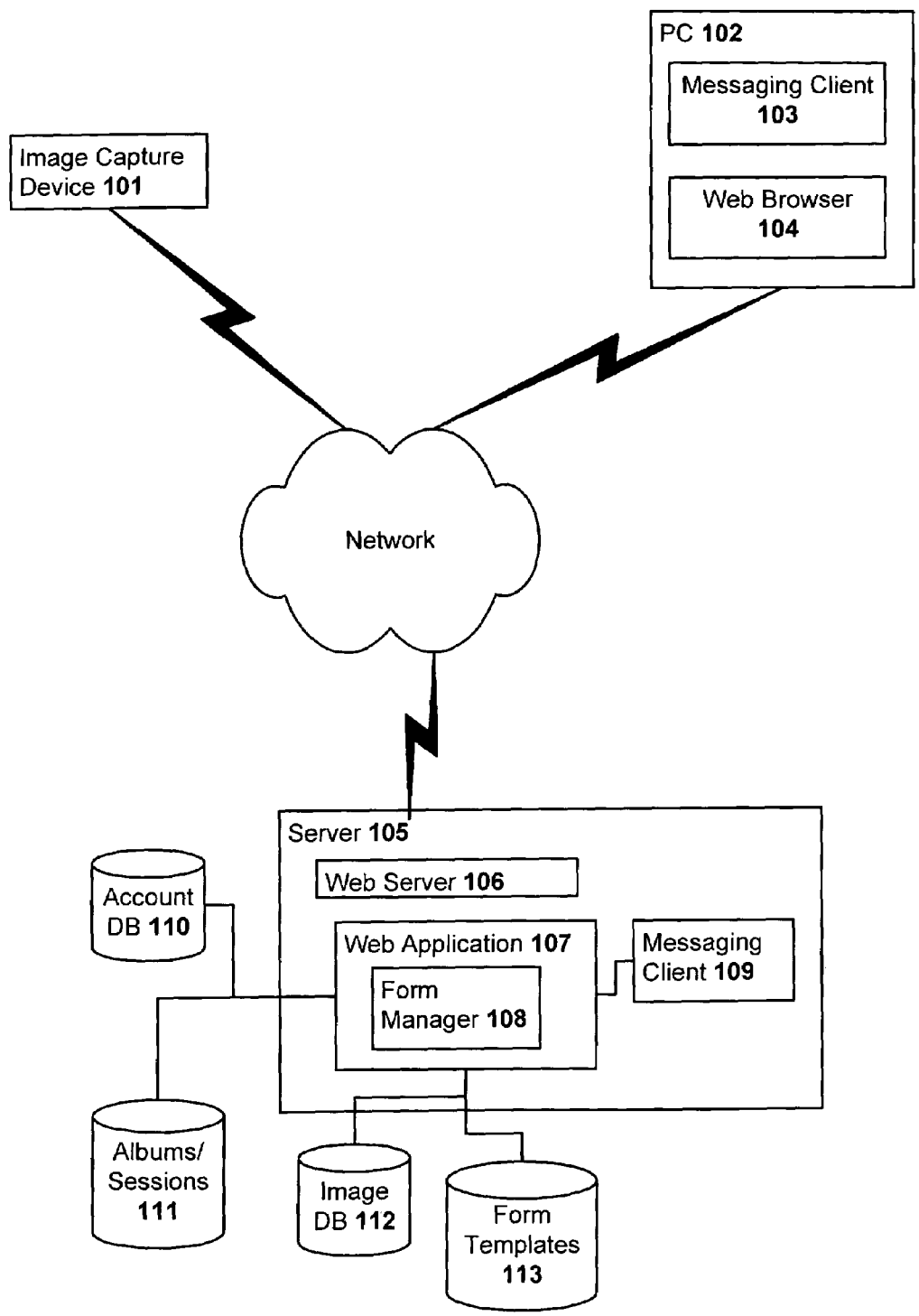
FIG. 1 illustrates an embodiment of a system for guiding the management of digital images.

FIG. 1 illustrates an embodiment of a system for guiding the management of digital images. The system includes an image capture device 101 and a personal computer 102 with a messaging client 103 (such as email) and a web browser 104. The message client 103 and web browser 104 can reside on the image capture device 101 instead. The system also includes a server 105, which is a web server 106 with a web application 107 capable of receiving digital images. For example, the web application 107 can be a digital photo-sharing application. The web application 107 has access to an accounts database 110 for storing user accounts, an albums or sessions database for storing photo album or session information, an image database 112 for storing the digital images, and a form template database 113 for storing forms related to specific tasks, including print orders and organization of the images. These forms are managed by the form manager 108 of the web application 107. The server 105 further includes a messaging client 109 capable of sending messages to a client device, such as the image capture device 101 or the personal computer 102. The messaging medium can be email, instant messaging, etc.

Figure 2:
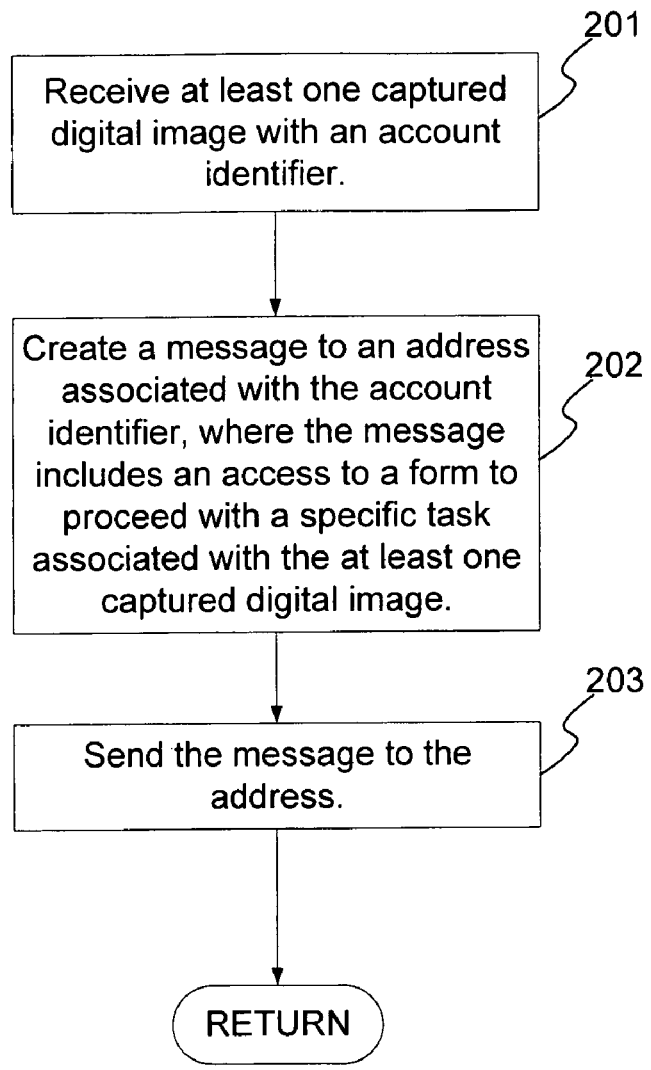
FIG. 2 is a flowchart illustrating an embodiment of the method for guiding the management of digital images.

FIG. 2 is a flowchart illustrating an embodiment of the method for guiding the management of digital images. Once the image capture device 101 captures at least one digital image, the digital image is sent to the server 105, along with the account identifier for the user, which the server 105 receives, via step 201. Once captured, either the entire digital image can be sent to the server 105 or a representation of the image can be transmitted to the server. The representation can be an icon view, a thumbnail view, or a screennail view of the captured digital image. The representation typically will include less data than the captured digital image and can allow for lower transmission times and costs when sending information to the server 105 during peak operating times. When needed, the complete captured digital image can be uploaded to the server 105 during off-peak times.

The server 105 then creates a message to an address associated with the account identifier, where the message includes an access to a form to proceed with a specific task associated with the at least one captured digital image, via step 202. The specific task can be a print order or the organization of digital images. Other possible tasks include editing, transferring or distributing or sharing, approving or certifying, and adding metadata. Instructions for performing the specific task associated with the at least one captured digital image can be sent to the server 105 along with the image. Alternatively, the server 105 can be configured to perform a default task based on standing instructions associated with the account identifier or based on preferences previously communicated to the server 105, such as a user specifying that they would like to receive print orders, merchandise orders, on-line photo-sharing albums, image distribution lists, and the like.

In this embodiment, when the digital image arrives, the form manager 108 retrieves the appropriate form for the next step in the specific task, which can vary by account, customizable by the account user. The server 105, through the messaging client 109, then sends the message to the address, via step 203. The access can be a link to the form on a web site, or the form can be embedded or attached to the message itself. The user can then access the server 105 to complete the specific task. In this manner, specific tasks for the management of digital images can be uploaded to a server, and the user is reminded to access the server to proceed with these tasks.

Figure 3:
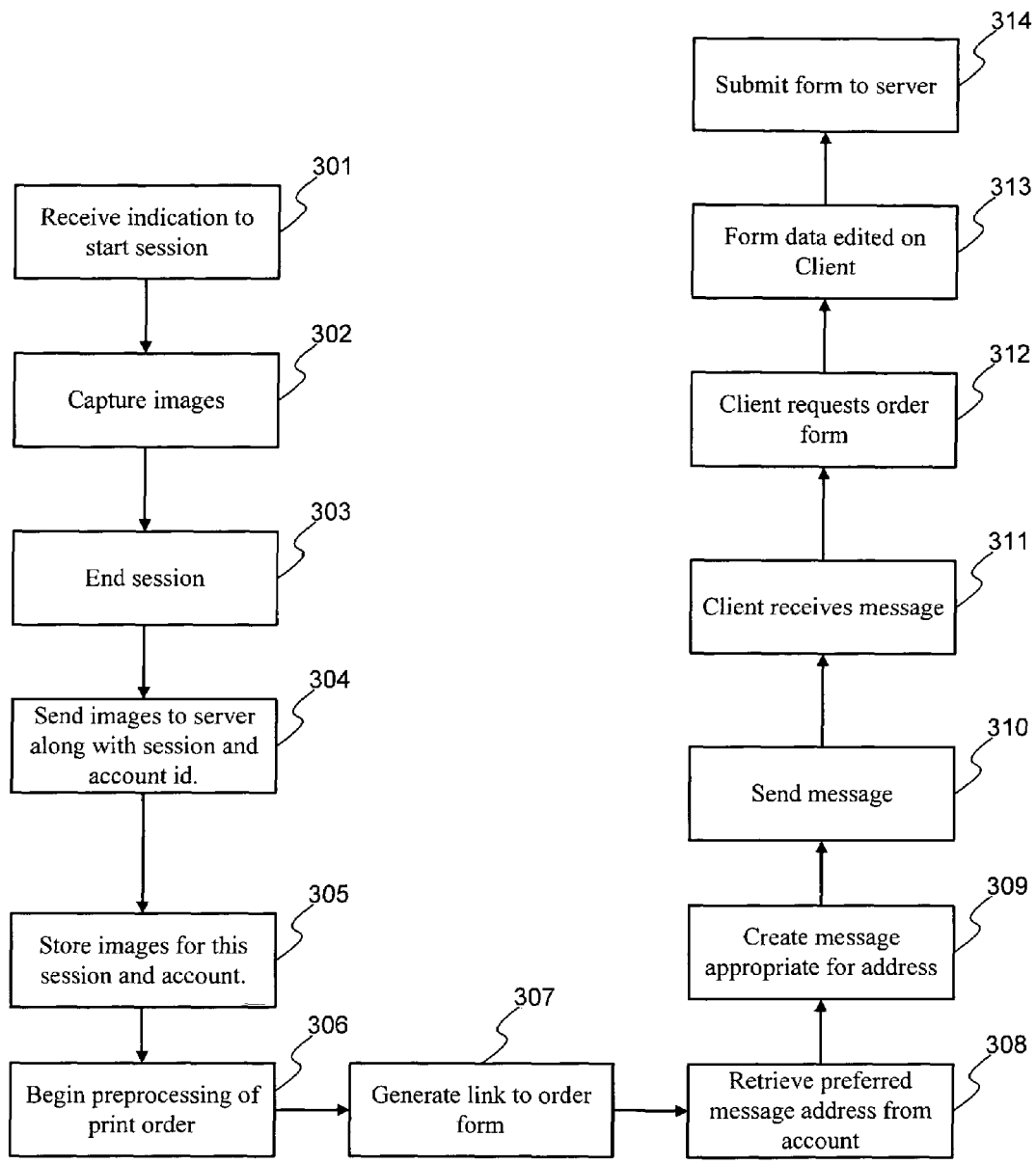
FIG. 3 is a flowchart illustrating an example of the guiding of a print order for digital images.

FIG. 3 is a flowchart illustrating an example of the guiding of a print order for digital images. A "session" can be any manner of grouping a set of digital images and can be determined automatically by the image capture device 101 or explicitly set by a user. First, the image capture device 101 receives an indication to start a session, via step 301. The user of the image capture device 101 then captures the images, via step 302. Once the session ends, via step 303, the captured images are sent to the server 105 along with the session and account identifier, via step 304. The server 105 then stores the images for this session and account identifier in the image database 111, via step 305. Assume that the account is set up to begin a print order once a digital image is received. The web application 107 then begins the pre-processing of the print order, via step 306. Pre-processing may include creating a shopping cart with orders for prints for each of the images in the session. The number of prints, size, and other attributes may be determined by settings set by the user earlier, or may be determined by the web application based on user's past order history, the number of images in the session, site promotions or sales, or other factors. The form manager 108 generates a link to the print order form, via step 307. The web application 107 retrieves the preferred message address for the account identifier from the account database 110, via step 308. The form manager 108 then creates a message appropriate for the address, with the link provided in the message, via step 309. The messaging client then sends the message to the address, via step 310.

Assume that the client is the personal computer 102. The messaging client 103 on the personal computer 102 receives the message, via step 311. The user accesses the message and clicks on the link, requesting the print order form, via step 313. The user edits the form data on the client, via step 313, and submits the form to the server 105, via step 314. The server 105 can then perform the next step in the printing task according to the form data.

Note that a "session" can be determined on the camera with each picture marked with an explicit session ID, or a "session" may be implicit. For example, all pictures that are received by the server in the same upload session may be considered to be in the same session.

For example, assume that Anna takes pictures of her daughter's soccer game. She selects an option on her digital camera to end "a session". Sessions are determined automatically or Anna can explicitly start and end sessions. Since she didn't start the current session, it began when the last session ended. Her camera then sends thumbnails and image identifiers to her imaging service, provided by a web application. The service constructs a print order for the images in the session and sends an email to Anna's home email address with a link to the form. Anna arrives home and sees the message from her image service in her email account. Her mail client supports HTML so the form appears in her email. She modifies the order, removing a couple of pictures, rotating one, changing the size of some of the prints, and adding the address of her mother as an additional recipient. She then submits the form for processing.

For another example, Phil places items for auction on eBay on behalf of his clients. Today he will be starting auctions for a 1990 Ford Taurus owned by Conan O'Brien, a sweat band purportedly worn by Michael Jordan (unwashed since its last use), and his own refrigerator since he and his wife have ordered a new one. Phil starts a new picture taking session for each item before he captures images of each. He explicitly indicates the end of each session. The images are transmitted to the auction site with his account identifier and the session identifier. For each session, a new auction is created with default data filled in where possible. An email is sent to Phil's work address for each session. Each email contains a link to a form where Phil can make the final selection of pictures to use from each session as well as provide more data about each item. Once finished with this step, the items are publicly available for auction.

A method and system for guiding the management of digital images have been disclosed. The method and system sends at least one captured digital image with an account identifier. The server creates a message to an address associated with the account identifier, where the message includes an access to a form to proceed with a specific task associated with the at least one captured digital image. The server then sends the message to the address. A user can then access the form through the message and provide form data to the server. The server can then proceed with the next step in the task. In this manner, specific tasks in the management of digital images can be uploaded to a server, and the user is reminded to access the server to perform these tasks. The user is not required to manage the image on the image capture device or to remember to finish a specific task associated with the captured images.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for guiding management of digital images, comprising:

receiving, at a server on a network from an image capture device, at least one captured digital image with an account identifier for a user associated with the image capture device;

in response to receiving the at least one captured digital image from the image capture device:

associating the at least one captured digital image with an electronic form to automatically prepare an electronic order for processing the at least one captured digital image, wherein the electronic order is prepared for the user;

creating an electronic message to an address associated with the account identifier, wherein the electronic message includes a link for accessing and modifying the electronic order prior to processing the at least one captured digital image; and sending the electronic message to the address via the network.

2. The method of claim 1, further comprising:

capturing the at least one digital image for a session by the image capture device; and sending the at least one digital image with the account identifier and a session identifier to the server.

3. The method of claim 1, wherein the receiving further comprises:

storing the at least one digital image for the account identifier; and pre-processing the at least one digital image.

4. The method of claim 1, wherein the creating comprises: retrieving a preferred address for the account identifier.

5. The method of claim 1, further comprising:

receiving the message by a client;

requesting the electronic order by the client;

providing data for the electronic order by the client; and sending the data for the electronic order to the server.

6. The method of claim 5, further comprising:

processing the at least one captured digital image by the server based on the electronic order.

7. The method of claim 1, wherein processing the at least one captured digital image comprises one or more of the group consisting of:

printing;
organization;
editing;
transferring;
distributing;
sharing;
approving;
certifying; and
adding metadata.

8. The method of claim 1, wherein instructions for processing the at least one captured digital image are received along with the at least one captured digital image.

9. A system, comprising:
a web application hosted at a server on a network, wherein the web application is configured for receiving from an image capture device at least one captured digital image with an account identifier for a user associated with the image capture device,
wherein the web application is configured to, in response to receiving the at least one captured digital image from the image capture device:
associate the at least one captured digital image with an electronic form to automatically prepare an electronic order for processing the at least one captured digital image, wherein the electronic order is prepared for the user;
create an electronic message to an address associated with the account identifier, wherein the electronic message includes a link for accessing and modifying the electronic order prior to processing the at least one captured digital image; and
a messaging client configured for sending the message to the address via the network; and a memory for storing at least one captured digital image.

10. The system of claim 9, further comprising an image capture device, wherein the image capture device captures the at least one digital image for a session and sends the at least one digital image with the account identifier and a session identifier to the web application.

11. The system of claim 9, wherein the web application comprises a form manager for generating the electronic order for processing the at least one captured digital image.

12. The system of claim 9, wherein processing the at least one captured digital image comprises one or more of the group consisting of:
printing;
organization;
editing;
transferring;
distributing;
sharing;
approving;
certifying; and
adding metadata.

13. The system of claim 9, wherein the at least one captured digital image comprises instructions for processing the at least one captured digital image.

14. A method for guiding management of digital images, comprising:
sending to a server on a network from an image capture device, at least one captured digital image with an account identifier for a user associated with the image capture device;
receiving an electronic message at an address associated with the account identifier, wherein the electronic message includes a link for accessing and modifying an electronic order for processing the at least one captured digital image prior to processing the at least one captured digital image, wherein the electronic order is prepared for the user; and
sending data for the electronic order to the server.

15. The method of claim 14, wherein the sending of the at least one captured digital image comprises:
capturing the at least one digital image for a session; and
sending the at least one digital image with the account identifier and a session identifier to the server.

16. The method of claim 14, wherein the server processes the at least one captured digital image based on the electronic order.

17. The method of claim 14, wherein the at least one captured digital image comprises instructions for processing the at least one captured digital image.

18. A computer readable medium with program instructions for guiding management of digital images, comprising:
receiving, at a server on a network from an image capture device, at least one captured digital image with an account identifier for a user associated with the image capture device;
in response to receiving the at least one captured digital image from the image capture device;
associating the at least one captured digital image with an electronic form to automatically prepare an electronic order for processing the at least one captured digital image, wherein the electronic order is prepared for the user;
creating an electronic message to an address associated with the account identifier, wherein the electronic message includes a link for accessing and modifying the electronic order prior to processing the at least one captured digital image; and
sending the electronic message to the address via the network.

19. The medium of claim 18, wherein the creating comprises:
retrieving a preferred address for the account identifier.

20. A computer readable medium with program instructions for guiding management of digital images, comprising:
sending from an image capture device connected directly to a network, at least one captured digital image with an account identifier for a user associated with the image capture device;
receiving an electronic message at an address associated with the account identifier, wherein the electronic message includes a link for accessing and modifying an electronic order for processing the at least one captured digital image prior to processing the at least one captured digital image, wherein the electronic order is prepared for the user; and
sending data for the electronic order to a server.

* * * * *